United States Patent [19]
Soblesky

[11] 3,953,058
[45] Apr. 27, 1976

[54] TUBE COUPLING
[75] Inventor: John W. Soblesky, Clyde, Ohio
[73] Assignee: Dale Products, Inc., Fremont, Ohio
[22] Filed: Dec. 20, 1974
[21] Appl. No.: 534,683

[52] U.S. Cl. ............................. 285/110; 285/320
[51] Int. Cl.² .................................. F16L 37/20
[58] Field of Search .......... 285/110, 111, 309, 310, 285/311, 340, 320, 317, 337

[56] References Cited
UNITED STATES PATENTS

| | | | |
|---|---|---|---|
| 1,175,438 | 3/1916 | Gzupkaytie | 285/309 X |
| 1,621,980 | 3/1927 | Goodman | 285/110 X |
| 1,646,873 | 10/1927 | Richards | 285/320 |
| 1,815,407 | 7/1931 | Jones | 285/309 X |
| 2,184,376 | 12/1939 | Beyer et al. | 285/110 X |
| 2,887,328 | 5/1959 | Risley et al. | 285/337 X |
| 3,314,698 | 4/1967 | Owens | 285/320 X |
| 3,411,814 | 11/1968 | Dillon | 285/340 |
| 3,841,672 | 10/1974 | Schultz et al. | 285/320 X |

FOREIGN PATENTS OR APPLICATIONS

| | | | |
|---|---|---|---|
| 684,604 | 3/1965 | Italy | 285/320 |
| 102,847 | 11/1963 | Norway | 285/110 |

Primary Examiner—Thomas F. Callaghan
Attorney, Agent, or Firm—David H. Wilson, Jr.

[57] ABSTRACT

A tube coupling having an arcuate grip surface which engages with and secures tubing with minimum scarring and distortion of the tubing. The grip surface is rotatable to successively present arcs of smaller radius to the tube whereby the gripping engagement tends to occur over a long line of contact. One embodiment employs a right-circular cylindrical cavity only slightly larger than the tube to be coupled for reception of the tube and a rotatable locking element mounted normal to the cavity and intersecting with the cavity to present a gripping surface to the cavity which upon rotation in a biased direction presents a groove defining in the cross-section of the cavity a succession of arcs of progressively smaller radius to the cavity and a tube therein until an arc conforms to and grippingly engages the tube as it bears against an opposing cavity wall. Various seal structures of elastomeric material are accommodated within the coupling body.

18 Claims, 15 Drawing Figures

TUBE COUPLING

BACKGROUND OF THE INVENTION

1. FIELD OF THE INVENTION

This invention relates to tube couplers and more particularly to quick connect and disconnect tube couplers which establish an effective seal with the end of a tube.

2. BACKGROUND OF THE INVENTION

While many applications for quick acting tube couplings exist, couplers of the present invention have been developed particularly for manufacturing and testing equipment designed to handle fluids. For example, in the manufacture of many refrigeration components those components require testing by the application of fluid under pressure, sometimes preceded by a flushing of the fluid passages of the component and a drying of the flushing liquid in those passages. In manufacturing operations rapid testing is sought. This involves, in the case of fluid tests, a rapidly applied, safe, reliable coupling which can withstand substantial pressures and will function for a large number of operating cycles. Since the flushing, drying and/or testing procedures require only temporary connections, it is essential that the application of the coupling impose minimal distortion on the tube ends to which they are applied in order that those ends can be connected with minimum effort into the system for which the tested component is intended. Further, the tube ends to which connections are to be made are frequently short and smooth walled such that the grip required to maintain the coupling has only a restricted region of the tube wall to which it is to be secured and can tolerate only slight distortion. In the case of thin walled tubes this avoidance of distortion is particularly difficult to achieve.

The sealing functions also must be effective for substantial pressure differentials. Fluid pressures of several hundred pounds per square inch may be required for flushing or testing. In some instances vacuums must be accommodated. Where high volumes of fluid must be passed through the coupling in a minimum time interval the seal should not introduce flow restrictions.

In many applications it is advantageous to maintain fluid pressure on the test lines to the connector and to release that pressure to the device to which the connector is applied as soon as a suitable sealed coupling has been achieved. This expedites the test procedure and simplifies the manual manipulations required at the test station.

SUMMARY OF THE INVENTION

The present invention relates to a tube coupling particularly adapted for cooperating with short stubs of smooth walled tubes which utilizes a gripping surface which effectively secures the tube with little or no distortion and can accommodate a range of outside diameters. Gripping is by means of a rotatable grip pin having a gripping surface extending progressively around its axis of rotation with a progressively decreasing radius from a center a constant radius from the axis of rotation. This grip surface is opposed by a fixed anvil which can be in the form of a wall of a cavity adapted to receive the tube. Biasing means are associated with the grip pin tending to rotate it around its axis of rotation which is fixed with respect to the anvil, such that the spacing between the anvil and the gripping surface of the pin diminishes as the pin rotates in its biased direction. If the gripping surface radii and its spacing from the anvil are proportioned to engage a tube wall with the plane of the arc of the surface extending normal to the longitudinal axis of the tube, the gripping surface will engage the tube wall over a substantial arc and secure it firmly against withdrawal. For example, where the plane of the arc of contact at the time the tube is engaged by the grip surface and anvil is inclined about 10° from perpendicular with respect to the tube axis and the arc is a semicircular, the grip surface contact will be over about 140° for a copper tube. This long contact is particularly effective without distorting the tube where the anvil is a cylindrical wall generally corresponding to the outer cylindrical wall of the tube opposite the gripping surface.

The seat for the coupling can be a plug having a seal area of butt form where the end of the tube is inserted into compassing abutment with the seal and the seal is of elastomeric material extending over the entire end wall of the tube. Such a seal can perform a plugging function where it has no passage communicating with the interior of the tube. It can alternatively provide a communicating path to a conduit connected to the coupling as by means of a bore registering with the interior of the tube.

In the case where high volume flow is required the coupling seal can be in the form of a thin walled cup fitting the same cavity of the coupling as the aforementioned plug arranged with re-entrant lip of annular form presenting a radius to the free end of the tube as it is introduced into the coupling to accommodate and embrace that free end. Fluid pressure enhances the seal where the seal structure is of thin walled flexible elastomer by compressing the reentrant portion on the outer wall of the tube. In the case where subatmospheric pressure is to be applied a rigid liner tube integral with the coupling is located within the seal cup so that atmospheric pressure compresses the cup walls onto the liner to establish a sealing relationship. Such a liner tube or other structure also functions as a limit on the degree of insertion of a tube into the coupling and can be arranged with a sliding fit to actuate valve mechanisms.

Tube couplers heretofore have been designed and constructed for individual tube diameters thereby necessitating a large number of models and substantial parts inventory. The present coupling has been arranged to utilize a standard coupling body and locking element to accommodate a range of tube outside diameters by boring the desired tube receiving diameter in the body, fitting the appropriate seal within the body cavity, and orienting the locking element to afford the range of rotation in its journal in the body which provides the release and grip positions of the gripping surface on that element for the tube to be accommodated. In this manner the inventory of parts is greatly reduced without a sacrifice in the range of tubes to which the coupling structure is applicable.

The above and other aspects and features of the invention will be appreciated more fully when read with reference to the drawings of typical couplings according to this invention.

BRIEF DESCRIPTON OF THE DRAWINGS

Figure 10:
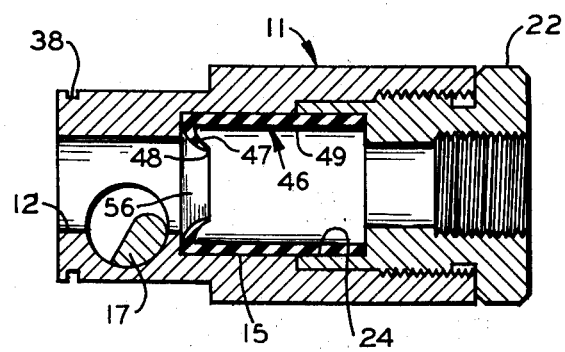
Figure 11:
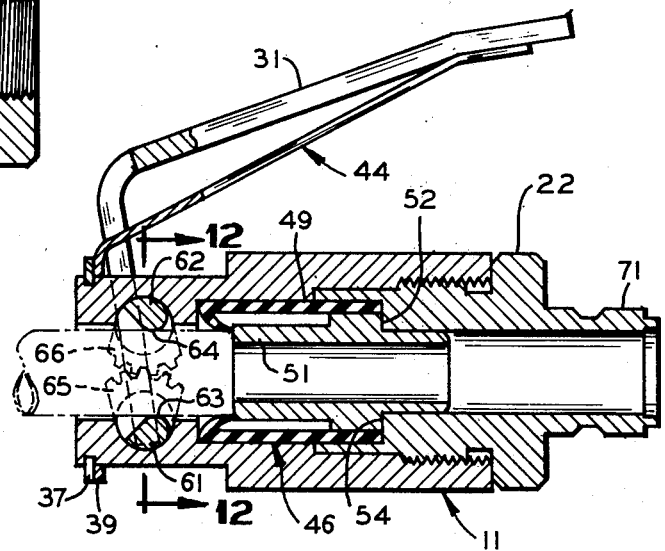
Figure 12:
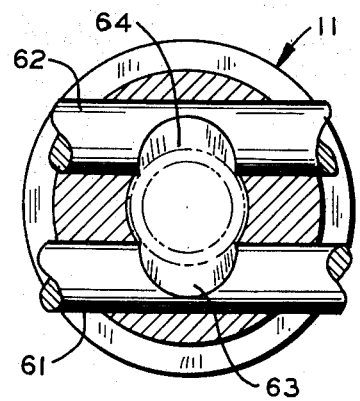

FIG. 10 is a sectional elevational view taken through the longitudinal centerline of the tube receiver of the coupling for a coupling having a seal adapted for a high flow rate; and FIG. 11 is a view similar to that of FIG. 10 for a coupling having an internal stop for the tubes it is adapted to receive, an inner support tube to accommodate subatmospheric fluid pressures, the male portion a quick disconnect of a type commercially available, and opposed locking elements and gripping surfaces; and FIG. 12 is an enlarged fragmentary cross-sectional view taken at line 12—12 of FIG. 11 to show the locking relationship of the opposed gripping surfaces.

DETAILED DESCRIPTION OF THE PREFERRED EMBODIMENTS

Figure 1:
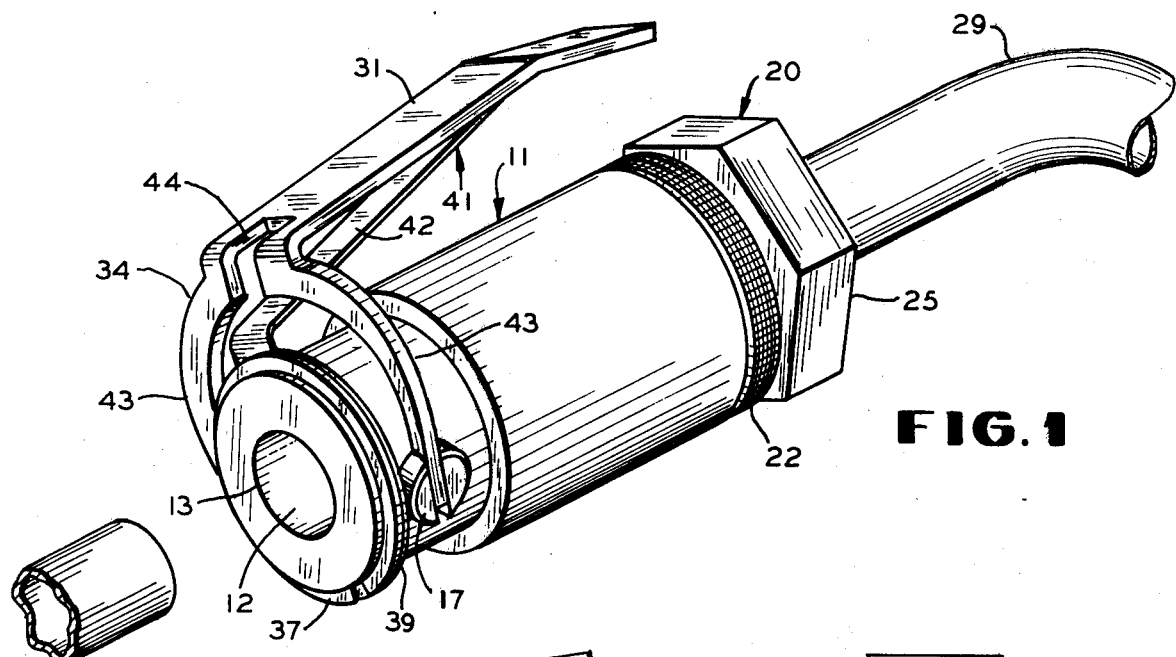
FIG. 1 is a top-front perspective view of a coupling according to this invention showing the end of a tube to which the coupling is applied and a portion of a typical flexible conduit with which the coupling is associated in fluid communication.
Figure 2:
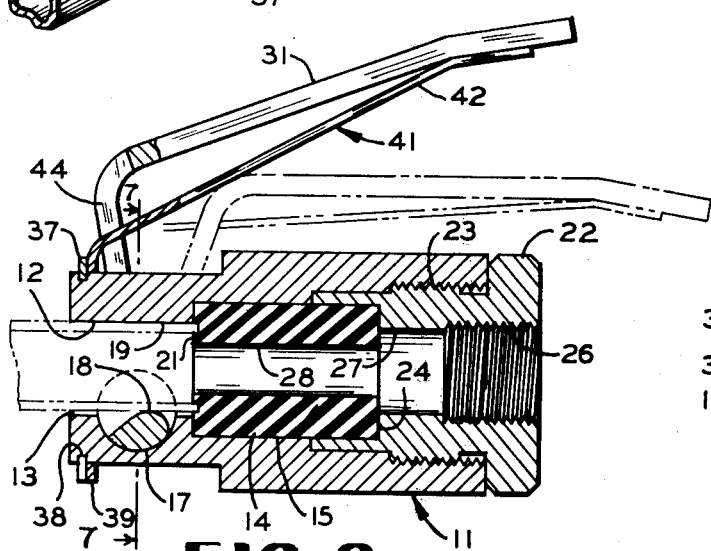
FIG. 2 is a side sectioned elevational view of a coupling and a tube shown in phantom mounted therein taken in the plane including the longitudinal axis of the tube to illustrate features according to this invention and showing a butt type of seal element.
Figure 3:
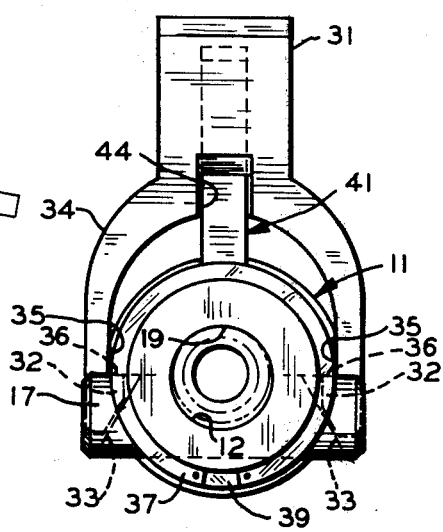
FIG. 3 is a front elevational view of the coupling and its accommodated tube shown in phantom according to FIG. 2.

As shown in FIGS. 1 through 3, one form of coupling is formed of a main body or barrel 11 having a central longitudinal bore 12 adapted to receive a tube through an aperture 13 at one end and to receive an elastomeric seal 14 into an enlarged bore 15 from its opposite end. A tube locking element 17 is located adjacent the tube receiving aperture 13 so that it can engage a tube inserted into bore 12 with a gripping surface 18 and secure the tube between the surface 18 and an anvil 19 which can be the portions of the barrel defining the wall of bore 12 diametrically opposed to the surface 18.

A tube end is sealed as shown in phantom in FIG. 2 by abutting the end 21 of seal 14 and distorting that end to conform to the tube and to flow around its wall thickness so that it tends to make limited engagement with the inner and outer surfaces of the tube. In the butt seal form of FIG. 2 the seal 14 can be a right-circular cylinder generally conforming to the inner diameter of enlarged bore 15. A threaded adapter of closure 22 engages suitable threads 23 at the rear of barrel 11 and is formed with a cupped region 24 having the same diameter and concentric with enlarged bore 15 so that it accommodates the back end of seal 14.

Suitable threaded coupling means 20 can be applied to the adapter 22 as by means of a nipple 25 engaged with threads 26 exposed to the rear and concentric with a passage 27 aligned with passage 28 in the seal. Thus, the interior of the coupled tube is in fluid communication with conduit 29 through passages 28 and 27. Where a tube is merely to be sealed, the adapter 22 can be formed with a closed end, as by the elimination of passage 27.

The coupling is secured to the tube to which it is to be applied by the insertion of the tube into a bore 12 which closely conforms to the outer diameter of the tube and by the gripping of the tube outer wall between the upper portion or anvil 19 of the wall of bore 12 as viewed in FIGS. 2 and 3 and a gripping surface 18 which is extended into the right circular cylindrical region defined by the bore wall a distance spaced from the anvil less than the outer diameter of the tube. Gripping surface 18 is generally an arc of a circle in the plane of the cross-section of bore 12 and is arranged such that the arc is of a progressively changing radius and is biased to present successively reduced radius arcs to the bore 12 by forming the gripping surface 18 on a rotatable locking element journaled in the barrel 11. Where locking element 17 is a right-circular cylinder and is mounted so that its projected cylindrical surface is tangent to the longitudinal axis of the tube receiving bore 12, the gripping surface 18 can be of the form of a semicircular groove in which the centers of the semicircles all lie in a plane normal to the rotational axis of element 17 and coincident with the longitudinal axis of the tube receiving bore 12. These semicircles are in planes extending radially from the rotational axis of element 17 and are arranged so that a semi-circle having a radius equal to or larger than the radius of bore 12 is presented to the bore at one extreme of the rotation of lock element 17 including the region in which the element is maintained for introduction of the tube into bore 12. At the opposite extreme of rotation of the lock element 17 the radius presented to the bore 12 is less than that of the tube to be gripped and extends the gripping surface into the bore so that it is spaced from the anvil less than the tube diameter.

Typically a coupler for a nominal 0.500 inch o.d. tube, a tube having a typical tolerance of ± 0.003 inch, has a bore 12 of 0.510 inch diameter. A similar coupler for a 0.250 inch o.d. tube with similar tolerance, has a bore 12 of 0.258 inch diameter. A right circular cylindrical lock pin of 0.410 inch diameter milled to form a grip surface over 180° around the pin by means of a conical miller head having a 30° included angle will accommodate both the 0.500 inch and 0.250 inch diameter tubes when combined with a suitable diameter of bore 12. Such a pin having arcs subtending 180° in each of its planes extending from its turning axis will have sufficient material at its minimum cross-section, the center plane of the groove, to accommodate all stresses imposed upon it.

In gripping a tube, the locking element 17 is rotated in a direction presenting successively smaller radius semicircles of gripping surface to the cross-section of the coupler bore 12. When the pin cylinder is tangent to the bore longitudinal axis, the exemplary slight undersize of the tube o.d. relative to the bore will cause the diametrically opposed sides 30 of the gripping surface to engage the tube wall first. This initiates a slight pinching in of the tube sides and a slight distortion of the tube to an oblong for as smaller radii gripping surfaces are presented to the tube until the diametrically opposed sides of the tube of its major cross-sectional axis X—X is subject to radial inward forces between the center of the gripping surface and anvil 19. At this time the minor axis Y—Y of the eliptical tube cross-section is slightly above the grip of surface 18 as viewed in FIG. 8 and the grip surface is in engagement with the tube wall over essentially its entire cross-section arc. This ultimate grip position occurs as the radial plane of the arc of the grip surface which matches the o.d. of the tube is carried slightly beyond normal to the tube longitudinal axis.

It will be noted that the gripping action is afforded by an arc of a circle in a plane normal to the longitudinal axis of the tube. In the case of a bore of circular cross-section this is also normal to that bore longitudinal axis. However, the anvil surface need not be a bore wall and can be provided by other forms of tube constraining surfaces opposite the gripping surface. Further, the gripping surface need not be positioned on a rotatable lock element having its axis of rotation in a plane normal to the longitudinal axis of the tube contained by the coupler. If the lock element rotational axis is in a plane inclined to the tube longitudinal axis the groove forming the gripping surface can be skewed on the lock element to present arcs of circles which are in planes normal to the tube axis and are of progressively decreasing radius in the locking direction of rotation.

A handle 31 providing means for rotating the locking element 17 is secured to the locking element 17 by fingers 32 which fit into slots 33 in the end of element 17. Handle 31 is in the form of a ball 34 which closely conforms in its distal inner surfaces 35 to the outer surface of barrel 11 so that in the position shown in FIGS. 2 and 3 it is constrained in its upward motion by the barrel wall and in its downward motion by the inclined diverging lands formed by the slots 33. The handle is mounted by inserting fingers 32 in slots 33 so their upper edges 36 are flush with or within the cylindrical surface of lock pin 17. Locking pins 17 is at that time rotated 180° from its illustrated position. The assembly is then rotated to the position shown and then a retainer is secured on the end of the barrel.

A lock ring 37 fits into a suitable annular groove 38 in the end of barrel 11 as a retainer. Stacked on the barrel between lock ring 37 and the locking pin 17 with its bail 34 is a ring base 39 for a biasing spring 41 which tends to rotate handle 31 counter-clockwise as viewed in FIG. 2. Spring 41 includes an arm 42 which bears upon the underside of handle 31 and presents its base ring 39 as a stop preventing the legs 43 from rotating counter-clockwise beyond the coupling barrel end. Clearance in handle 31 for the spring arm 42 is provided by slot 44 which permits the handle to be depressed toward the barrel.

One particular advantage of the coupling discussed above is that its adapter 22, seal 14, handle 31, spring 41, lock ring 37 and lock pin 17 can be standard parts for a wide range of tube couplings. For example, standard parts can be employed for couplings accommodating tubes ranging from ⅛ to ⅜ inch outside diameter and another set of standard parts can accommodate the range ⅜ to ⅝ inch. In these assemblies the barrel or body blank 11 also can be standard for each range of tube sizes and the location of the lock pin journals can be standard provided the bore 12 extending into the seal cavity of enlarged bore 15 is located with its longitudinal center coaxial with the barrel body and thus tangent to the cylindrical projection of lock pin 17. This enables a wide range of tubes to be accommodated by a relatively few parts and lends substantial economy to the tube coupler construction.

It will be appreciated that the grip surface for any given tube to be accommodated has a limited range of motion and thus need not present the entire surface 18 to the bore 12. In a typical construction the range of rotational motion around the axis of the pin 17 is about 36° with somewhat greater than half that motion, the terminal portion as the handle 31 approaches the body, freeing the tube of any gripping action as it exposes an arc of radius equal to or greater than the radius of the bore 12 to that bore. The smaller radius arcs are brought into bore 12 as the handle is biased by spring 41 toward its forward position. As the presented arc radius, that in the plane normal to the bore, becomes less than the bore radius the spacing of the center of the arc from the opposed anvil 19 of the bore wall reduces to less than the diameter of the bore and approaches that of the tube positioned therein. This will tend to flatten the tube toward an eliptical form. In practice, it appears that any tendency to expel the tube from the bore either by resilience of the seal plug or the fluid pressure within the coupled tube will tend with the bias forces of the spring 41 to rotate the lock pin to bring smaller radius arcs into engagement with the tube. This results in tighter gripping of the tube.

Figure 4:
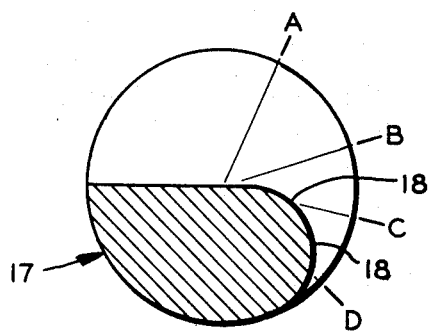
FIG. 4 is an enlarged cross-section of the locking element for the coupling of FIG. 2 taken in the plane of FIG. 2.
Figure 5:
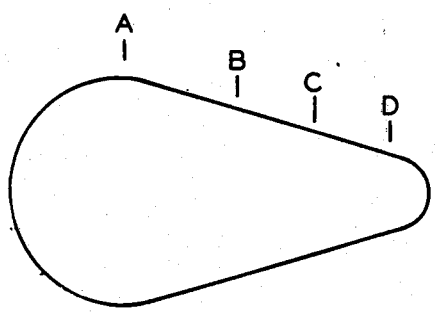
FIG. 5 is a development of the locking element surface produced by unrolling the surface of a right-circular-cylindrical locking pin according to FIG. 4 to show the form of the gripping surface at that pin surface.
Figure 6:
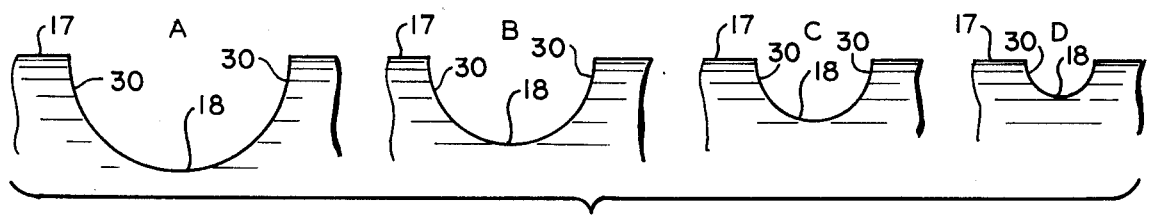
FIGS. 6A through 6D are sections of a typical locking surface taken at radial planes A through D extending from the axis of rotation of the locking pin as shown in FIG. 4 for a pin mounted with its axis of rotation in a plane, normal to the longitudinal axis of the tube receiver.
Figure 9:
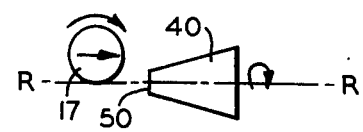
FIG. 9 is a schematic illustration of one form of apparatus for fabricating the grip surface on the locking element.

The gripping surface as developed in FIG. 5 as a pair of converging lines terminated in arcuate ends and as shown at various stations in FIGS. 6A through 6D as semicircular arcs of circles lying in planes extending radially from the axis of rotation of locking element 17 as those stations are advanced from the tube releasing position to the tube gripping position are developed by a conical milling head 40. In cross-section at the center of the arc, i.e. in a plane normal to the pin axis and including the bore axis, the surface appears as in FIG. 4. In FIG. 9 such a head 40 is shown wherein the minimum diameter 50 of the frusto conical head is an eighth of an inch and the included angle of the conical faces is 30°. The lock pin 17 is formed by maintaining its cylindrical surface on the rotating axis R—R of the milling head and rotationally advancing the pin into the head while maintaining its tangent along the axis of the head. It is to be appreciated that the depth of the groove forming the gripping surface can be other than semicircular in the radial planes extending from the turning axis of the locking element. For example, the groove can be made an arc of a circle which subtends less than 180° by spacing the line of motion of the pin advance into the milling head from the axis of rotation R—R of the head. In the example illustrated in FIG. 9, this might be accomplished by having that line parallel to the axis of rotation R—R and spaced from the axis 1/16 of an inch. In each instance, however, it is desirable that the center of the arc in each plane as it is normal to the axis of the tube receiver, bore 12, is equidistant from the axis of the tube receiver. In the case of a locking element axis of rotation in the plane normal to the tube axis those arcs are in planes extending radially from the locking element axis of rotation and have centers equidistant from that axis for a given gripping surface.

The arc presented to the tube is most effective as a gripping surface if it is between 90° and 180°. When beyond 180°, it tends to limit its contact to its ends. When greater than 90° it imposes components of opposing forces which tend to pinch the sides of the tube in the dimension of the minor axis Y—Y discussed with respect to FIG. 8 thereby enhancing the gripping force and insuring a long line of contact between the gripping surface and tube wall.

Modifications of the tube coupling are shown in FIGS. 10, 11 and 12. Where large volumes of fluid are to be transferred rapidly, the constriction of the reduced diameter passage 28 in the butt type seal of FIG. 2 limits flow. An improved, full flow seal 46 is shown in FIGS. 10 and 11. The seal 46 is in the form of a cup of relatively thin walled elastomer and of the same cylindrical dimensions as the body of seal 14 so that seals 14 and 46 can be interchanged in the coupling. The seal 46 includes a re-entrant portion 47 extending from the tube receiving end of the coupling rearwardly thereof and defining an opening 48 which snugly fits with a slight interferring fit, the tube which the coupling is adapted to receive. A tube end is received in opening 48 when it is inserted beyond the coupling bore 12 and into the cavity of bore 15 and is embraced by the re-entrant portion and the walls defining opening 48 with sufficient conformation to and contact with the outer surface of the tube that upon imposition of fluid pressure the re-entrant portion is pressed upon the tube to form a tight seal. Positive fluid pressure flexes the seal 46 and forces the re-entrant portion 47 inward onto the tube and the outer wall portions 49 against the walls of bore 15 and the cupped region 24 of adapter 22. When negative pressure is imposed, atmospheric pressure admitted at the threaded joint between the adapter 22 and barrel 11 tends to collapse the outer wall portions 49 thereby pressing the re-entrant portion 47 onto the tube to seal that joint. FIG. 11 shows an internal stop 51 for the end of a tube inserted in the coupling. That stop is the end of a sleeve having an internal bore generally corresponding to the bore of the tube to be accommodated and generally coaxial therewith. That sleeve supports the collapsed seal walls 49 when the coupling is subjected to a vacuum whereby closure of the fluid communicating path through the coupling by the total collapse of the walls 49 onto each other is avoided. Sleeve 51 is supported from the rear of the coupling as by a flange 52 fitted into bore 15 to confine seal wall 49 between the bore 15 and flange 52. Flange 52 abuts the end 54 of adapter 22 or can be an integral portion of adapter extending from the bottom of its cupped region 24.

In both FIGS. 10 and 11 the full flow seal 46 has a front wall 56 of curved and tapered form fairing into the re-entrant portion 47. The radius of this wall combined with its flexibility and resilience guides the seal and tube into an effective mating and sealing relationship in opening 48 without tending to roll the seal back upon itself from the front portion of the cavity of bore 15. This configuration enables a long life seal which is effective for thousands of tube insertions to be fabricated with a wall thickness of about fifty thousandths of an inch from an elastomeric material of about 40 durometer. Similar 40 durometer material is employed with the butt seal configuration of FIG. 2. In a full flow seal a slight interference fit is established between the walls defining opening 48 and the o.d. of the tube it is to receive and seal. Typically, a 15/32th inch opening is provided for a ½ inch tube. The flowthrough seals can normally accommodate variations of up to one-sixteenth of an inch in tube o.d.

The embodiment of FIGS. 11 and 12 is arranged with diametrically opposed double lock pins 61 and 62 having the arcuate radial section gripping surfaces 63 and 64 of decreasing radius in the locking direction of pin rotation as discussed above. In this embodiment, which is particularly well adapted for coupling to tubes having flared ends, the arcs of the radial sections typically are less than semicircular since the lock pins are not both tangential to the longitudinal center of the tube receiving bore. The pins are diametrically opposed across the bore cross-section. Simultaneous rotation of the pins is achieved by the tooth coupled arcuate racks 65 and 66 driven by a single handle 31 and biasing means 44 of the type previously discussed connected to pin 61.

In the case of a flared tube end a butt seal of the type illustrated as seal 14 of FIG. 1 can be utilized effectively. Orientation of the free end of the tube can be enhanced by providing a nipple (not shown) having a taper conforming to the flare of the tube end and concentric with the longitudinal axis of the coupling and passage 28. Where the flare maximum diameter does not exceed the o.d. excessively, the full flow type of seal, as seal 46, can be employed with the various features including the stop 51 and vacuum accommodating sleeve if desired.

The locking pin and the gripping surface thereon lend themselves to coupling to smooth walled tube stubs where only a limited stub length is available. Sufficient tube support by the anvil surface of bore 12 and the locking surface is afforded with a tube length of about ½ inch. Typically, the rotational axis of the locking pin 17 is within ⅜ inch of the front face of the coupling. In the case of certain applications where the tube is flared or curved in its body portion close to the stub end to be coupled, the coupling can be chamfered in the region around the front face to enable a closer fit of the coupling to the flared or curved region to engage a maximum length of the tube stub. For example, in FIG. 2 the lower portion of the front face around aperture 13 can be chamfered, within limits to the dimensions required to support the journal for locking pin 17, to accommodate a tube bend or flare.

Other variants on the disclosed structures include an adapter provided with a rearwardly extending nipple 71 accommodating the fitting on the end of the conduit as shown in FIG. 11. Since there are commercially available quick disconnect fittings which include automatic internal valving which opens the fluid path therethrough as the connections are made, for example, as in the case of the EA series of quick-disconnects offered by Snap-tite, Inc. of Union City, Pa., it is contemplated that the adapter 22 can be made to cooperate with and actuate such valves. Thus, an automatic shut-off and turn-on is achieved to the coupling as it is disconnected and connected to its feed conduit.

Another feature contemplated in the construction of the rear portion of the coupling is the incorporation in the tube stop of a cushioning feature. The tube stop can be mounted to be engaged by the tube end as it is inserted and to yield axially of the assembly by incorporating a compressive bias spring (not shown) between the adapter and a portion of the structure of sleeve 51 such as the flange 52. Further, such a displaceable stop can be employed to lift a valve (not shown) in the adapter end of the coupling from its seat (not shown) to open a flow passage as the tube is introduced.

In view of the many variants of the coupling construction, it is to be understood that the above disclosure is merely illustrative of the invention and should not be read in a limiting sense.

What is claimed is:

1. A coupling for a smooth walled, right circular, tube portion to restrict longitudinal motion of the tube portion in a first direction comprising a tube receiving portion having a reaction surface to restrict motion of the tube portion it is adapted to receive transverse of the longitudinal axis of said tube portion and having a longitudinal axis parallel to the longitudinal axis of said tube portion; a locking element rotatable around an axis of rotation in a plane intersecting the longitudinal axis of tube receiving portion; means biasing said element for rotation around said axis of rotation in a given direction whereby points on a surface of said element proximate said tube receiving portion and engageable with a tube portion received therein have a component of bias force in said first direction; means for rotating said element around said axis of rotation in a direction opposite said given direction; and a gripping surface on said locking element adapted to engage an arcuate region of the smooth walled tube portion received in said tube receiving portion on the side of the tube portion opposite said reaction surface, said gripping surface defining successive arcs of circles of increasing radius from centers lying equidistant from the longitudinal axis of said tube receiving portion in a plane normal to said longitudinal axis of said tube receiving portion as said locking element is rotated in a direction opposite said given direction.

2. A coupling according to claim 1 wherein said locking element axis of rotation is in a plane normal to the longitudinal axis of the tube receiving portion.

3. A coupling according to claim 1 including a main body and wherein said reaction surface is mounted on said main body, and wherein said locking element is mounted on said main body with said gripping surface arcs centered in diametric opposition with respect to said reaction surface.

4. A coupling according to claim 1 wherein said means for rotating said locking element limits the arc of rotation of said element.

5. A coupling according to claim 1 including a main body having a tube portion receiving aperture and wherein said reaction surface is a surface of a cylinder having a generatrix coincident with the longitudinal axis of the tube receiving portion in said main body bounding a cavity in said main body in communication with said tube portion receiving aperture in said main body.

6. A coupling according to claim 5 wherein said locking element intersects with said cavity and said gripping surface has portions adapted to engage a received, smooth walled, tube portion in said tube receiving portion while the tube portion bears against said reaction surface.

7. A coupling according to claim 6 wherein said means for rotating said locking element limits the arc of rotation of said element to an arc of rotation from a rotational position spacing said gripping surface from said reaction surface a distance greater than the diameter of the tube portion received in said tube receiving portion to a rotational position spacing said gripping surface from said reaction surface a distance less than the diameter of said tube portion.

8. A coupling according to claim 7 wherein said arc of rotation is about 36°.

9. A coupling according to claim 2 including a body having a bore for the reception of the tube portion; wherein said locking element is a right circular cylinder and is journaled for rotation in said body with a projection of the cylindrical surface tangent to the longitudinal axis of the bore for receiving the tube portion; and the bisectors of the included arcs of said gripping surface intersect said longitudinal axis of the bore for receiving the tube portion.

10. A coupling according to claim 2 including a body having a cavity generally conforming to the outer surface of the tube portion to be received in said tube receiving portion; and a rotational mounting for said locking element positioned in said body to locate said gripping surface in said cavity.

11. A coupling according to claim 2 wherein the arcs of the circles defined by the gripping surface are greater than 90° whereby the opposite sides of those arcs tend to impose components of gripping force on an engaged tube.

12. A coupling according to claim 11 wherein the arcs of the circles defined by the gripping surface are no more than 180°.

13. A coupling according to claim 2 including a body having a cavity for the reception of a tube portion wherein said locking element is movable longitudinally of its axis of rotation and wherein said means for rotating said locking element is a bifurcated lever having branches straddling said body in close proximity thereto and secured to said locking element to maintain the longitudinal position of said element with respect to said body in an orientation presenting said gripping surface to said cavity.

14. A coupling according to claim 2 including a body having a cavity for the reception of a tube portion; and wherein said reaction surface comprises a second locking element rotatable around an axis of rotation in a plane normal to the longitudinal axis of the tube receiving portion; a rotational mounting for said second locking element positioned in said body to locate portions of said second locking element in said cavity; means for rotating said second locking element; and a second gripping surface on said second locking element and presented to said tube receiving portion, said second gripping surface defining successive arcs of circles of increasing radius from centers lying equidistant from the longitudinal axis of said tube receiving portion in a plane normal to said longitudinal axis of said tube receiving portion as said locking element is rotated to advance said gripping surface presented to said tube receiving portion in a direction opposite said first direction.

15. A coupling according to claim 14 including biasing means for said second locking element tending to cause rotation of said second element around said axis of rotation in a second given direction whereby points on said second gripping surface of said second locking element presented to said tube receiving portion have a component of bias force in said first direction.

16. A coupling according to claim 5 including an electromeric seal cylinder having an end proximate said tube portion receiving aperture adapted to abut the end of a tube portion when inserted in said aperture to effect a seal with the end of the tube portion, said seal cylinder conforming to said cylindrical walls.

17. A coupling according to claim 16 wherein said elastomeric seal cylinder has an open passage of smaller cross-section at its tube abutting end than the opening of the tube, said open passage at the tube abutting end being confined within the open tube end to provide a fluid path through the elastomeric cylinder.

18. A coupling according to claim 5 including an elastomeric seal cylinder having an internal diameter exceeding the outside diameter of the end of the tube portion to which the coupling is applied; a re-entrant seal end integral with said seal cylinder and of the material of said elastomeric cylinder proximate said tube portion receiving aperture, said end defining an opening having a greater diameter at its region adapted to initially receive said tube than the outer diameter of said tube and having an interfering fit at its region most remote from the end which initially receives the tube portion whereby the tube portion is guided into said re-entrant end and is embraced by said most remote portion of said re-entrant end; said seal end having a tapered annular region extending longitudinally and inward of said cylinder toward said opening; said seal cylinder conforming to said cavity walls of said main body; and said main body portion having a passage extending to a conduit aperture in said body opposite said tube portion receiving aperture.

* * * * *

UNITED STATES PATENT OFFICE
CERTIFICATE OF CORRECTION

Patent No. 3,953,058　　　　　　　　Dated April 27, 1976

Inventor(s) John W. Soblesky

Figure 7:
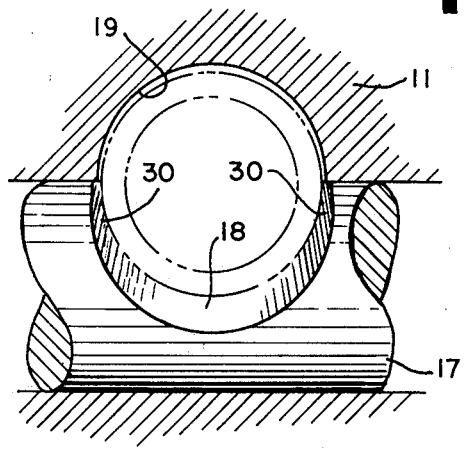
FIG. 7 is an enlarged fragmentary cross-sectional view of a fragment of the coupler of FIG. 2 taken at line 7—7 of FIG. 2 and showing the relationship of the locking element, tube and reaction surface of the tube receiving cavity of the coupler when the element is in its tube releasing position.
Figure 8:
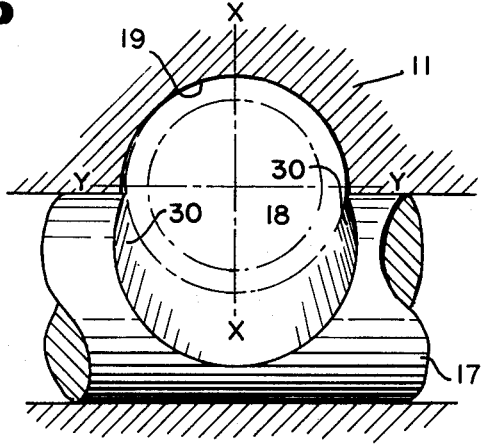
FIG. 8 is a view of FIG. 7 showing the relationships with the tube gripped by the grip surface and the reaction surface.

It is certified that error appears in the above-identified patent and that said Letters Patent are hereby corrected as shown below:

| | |
|---|---|
| Column 2, line 16 | Change "seat" to -- seal --. |
| Column 2, line 16 | Change "seal" to -- contact --. |
| Column 2, line 34 | Change "reentrant" to -- re-entrant --. |
| Column 3, line 29 | Change "Fig. 8 is a view of Fig. 7 to -- Fig. 8 is a view as in Fig. 7 --. |
| Column 3, line 35 | Change "sectional" to -- sectioned --. |
| Column 4, line 1 | Change second "of" to -- or --. |
| Column 4, line 39 | Change "semi-circle" to -- semicircle --. |
| Column 5, line 5 | Change "oblong for" to -- oblong form --. |
| Column 5, line 37 | Change "ball" to -- bail --. |
| Column 5, line 45 | Change "pins" to -- pin --. |
| Column 8, line 26 | Change "exceed the o.d." to -- exceed the tube o.d. --. |
| Claim 16, line 66 | Change "electromeric" to -- elastomeric --. |

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*